United States Patent [19]
Ohashi

[11] Patent Number: 5,978,502
[45] Date of Patent: Nov. 2, 1999

[54] MACHINE VISION METHODS FOR DETERMINING CHARACTERISTICS OF THREE-DIMENSIONAL OBJECTS

[75] Inventor: Yoshikazu Ohashi, Framingham, Mass.

[73] Assignee: Cognex Corporation

[21] Appl. No.: 08/626,041

[22] Filed: Apr. 1, 1996

[51] Int. Cl.$^6$ .................................................... G06K 9/00
[52] U.S. Cl. .......................... 382/147; 382/150; 382/286; 348/126
[58] Field of Search .................................... 382/145–147, 382/149, 150, 154, 168, 170, 203, 286; 356/237, 374; 348/87, 126, 130; 702/150, 155, 82, 113

[56] References Cited

U.S. PATENT DOCUMENTS

| | | | |
|---|---|---|---|
| 3,816,722 | 6/1974 | Sakoe et al. | 382/218 |
| 3,936,800 | 2/1976 | Ejiri et al. | 382/205 |
| 3,967,100 | 6/1976 | Shimomura | 364/735 |
| 3,968,475 | 7/1976 | McMahon | 382/124 |
| 3,978,326 | 8/1976 | Shimomura | 364/735 |

(List continued on next page.)

FOREIGN PATENT DOCUMENTS

| | | |
|---|---|---|
| 0 527 632 A2 | 2/1993 | European Pat. Off. . |
| WO 95/21376 | 8/1995 | WIPO . |
| WO 95/22137 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "PictureTel LIVE PCS 100(tm) Personal Visual Communications System," 3pp. (1993).

PictureTel Corporation Product Brochure "PictureTel System 1000: Complete Videoconferencing For Cost Sensitive Applications," 4pp. (1993).

PictureTel Corporation Product Brochure, "PictureTel System 4000(tm) a Family of Models to Fit your Application From Offices to Boardrooms, Classrooms, and Auditoriums," 4 pp. (1993).

Symantec Corporation, "The Norton pcANYWHERE User'S Guide," Table of Contents 8 pp; Introduction of pcANYWHERE Technology pp. i–vii; Chapter 7–Sessions; pp. 191–240 (1991).

(List continued on next page.)

*Primary Examiner*—Leo H. Boudreau
*Assistant Examiner*—Bhavesh Mehta
*Attorney, Agent, or Firm*—David J. Powsner; Choate, Hall & Stewart

[57] ABSTRACT

A method for determining spatial characteristics of a selected object in an image that has pixel values representing heights of corresponding portions thereof is characterized by the steps of finding one or more heights of portions of the object, determining a volume of the object at and above (or below) a selected height by summing a count representing a cross-sectional area of the object at that height with a count representing a volume of the object at a greater (or lesser) height, and outputting the volume so determined. A related method determines a cross-sectional area of an object in such a "height" image by finding one or more heights of portions of the object and summing a count of pixels in the object at the selected height with a count representing a cross-sectional area of the object above that height.

24 Claims, 5 Drawing Sheets

U.S. PATENT DOCUMENTS

| | | | |
|---|---|---|---|
| 4,011,403 | 3/1977 | Epstein et al. | 348/370 |
| 4,115,702 | 9/1978 | Nopper | 250/560 |
| 4,115,762 | 9/1978 | Akiyama et al. | 382/151 |
| 4,183,013 | 1/1980 | Agrawala et al. | 382/199 |
| 4,200,861 | 4/1980 | Hubach et al. | 382/216 |
| 4,254,400 | 3/1981 | Yoda et al. | 382/194 |
| 4,300,164 | 11/1981 | Sacks | 382/270 |
| 4,385,322 | 5/1983 | Hubach et al. | 358/160 |
| 4,441,124 | 4/1984 | Heebner et al. | 358/106 |
| 4,441,206 | 4/1984 | Kuniyoshi et al. | 382/8 |
| 4,534,813 | 8/1985 | Williamson et al. | 257/316 |
| 4,541,116 | 9/1985 | Lougheed | 382/49 |
| 4,570,180 | 2/1986 | Baier et al. | 358/106 |
| 4,577,344 | 3/1986 | Warren et al. | 382/1 |
| 4,581,762 | 4/1986 | Lapidus et al. | 382/22 |
| 4,606,065 | 8/1986 | Beg et al. | 382/18 |
| 4,617,619 | 10/1986 | Gehly | 362/302 |
| 4,630,306 | 12/1986 | West et al. | 382/21 |
| 4,688,088 | 8/1987 | Hamazaki | 358/101 |
| 4,706,168 | 11/1987 | Weisner | 362/18 |
| 4,728,195 | 3/1988 | Silver | 356/394 |
| 4,730,260 | 3/1988 | Mori et al. | 364/518 |
| 4,731,858 | 3/1988 | Grasmueller et al. | 382/9 |
| 4,736,437 | 4/1988 | Sacks et al. | 382/34 |
| 4,742,551 | 5/1988 | Deering | 382/18 |
| 4,764,870 | 8/1988 | Haskin | 364/415 |
| 4,771,469 | 9/1988 | Wittenburg | 382/25 |
| 4,783,826 | 11/1988 | Koso | 382/8 |
| 4,783,828 | 11/1988 | Sadjadi | 382/21 |
| 4,783,829 | 11/1988 | Miyakawa et al. | 382/22 |
| 4,831,580 | 5/1989 | Yamada | 364/900 |
| 4,860,374 | 8/1989 | Murakami et al. | 382/48 |
| 4,860,375 | 8/1989 | McCubbrey et al. | 382/49 |
| 4,876,457 | 10/1989 | Bose | 356/445 |
| 4,876,728 | 10/1989 | Roth | 382/21 |
| 4,903,218 | 2/1990 | Longo et al. | 364/521 |
| 4,907,169 | 3/1990 | Lovoi | 364/513 |
| 4,914,553 | 4/1990 | Hamada et al. | 362/32 |
| 4,922,543 | 5/1990 | Ahlbom et al. | 382/48 |
| 4,926,492 | 5/1990 | Tanaka et al. | 382/18 |
| 4,932,065 | 6/1990 | Feldgajer | 382/9 |
| 4,953,224 | 8/1990 | Ichinose et al. | 382/8 |
| 4,955,062 | 9/1990 | Terui | 382/8 |
| 4,959,898 | 10/1990 | Landman et al. | 29/705 |
| 4,962,423 | 10/1990 | Yamada et al. | 382/30 |
| 4,972,359 | 11/1990 | Silver et al. | 382/18 |
| 4,982,438 | 1/1991 | Usami et al. | 382/25 |
| 5,012,402 | 4/1991 | Akiyama | 364/192 |
| 5,046,190 | 9/1991 | Daniel et al. | 382/49 |
| 5,054,096 | 10/1991 | Beizer | 382/41 |
| 5,060,276 | 10/1991 | Morris et al. | 382/8 |
| 5,063,608 | 11/1991 | Siegel | 382/56 |
| 5,073,958 | 12/1991 | Imme | 382/22 |
| 5,081,656 | 1/1992 | Baker et al. | 382/8 |
| 5,081,689 | 1/1992 | Meyer et al. | 382/22 |
| 5,086,478 | 2/1992 | Kelly-Mahaffey et al. | 382/8 |
| 5,090,576 | 2/1992 | Menten | 209/587 |
| 5,091,861 | 2/1992 | Geller et al. | 364/474.34 |
| 5,091,968 | 2/1992 | Higgins et al. | 382/30 |
| 5,093,867 | 3/1992 | Hori et al. | 382/23 |
| 5,113,565 | 5/1992 | Cipolla et al. | 382/8 |
| 5,115,309 | 5/1992 | Hang | 358/133 |
| 5,119,435 | 6/1992 | Berkin | 382/8 |
| 5,124,622 | 6/1992 | Kawamura et al. | 318/569 |
| 5,133,022 | 7/1992 | Weideman | 382/18 |
| 5,134,575 | 7/1992 | Takagi | 382/8 |
| 5,143,436 | 9/1992 | Baylor et al. | 362/32 |
| 5,145,432 | 9/1992 | Midland et al. | 445/3 |
| 5,151,951 | 9/1992 | Ueda et al. | 382/19 |
| 5,153,925 | 10/1992 | Tanioka et al. | 382/52 |
| 5,159,281 | 10/1992 | Hedstrom et al. | 329/312 |
| 5,159,645 | 10/1992 | Kumagai | 382/22 |
| 5,164,994 | 11/1992 | Bushroe | 382/8 |
| 5,168,269 | 12/1992 | Harlan | 340/709 |
| 5,185,855 | 2/1993 | Kato et al. | 395/129 |
| 5,189,712 | 2/1993 | Kajiwara et al. | 382/42 |
| 5,206,820 | 4/1993 | Ammann et al. | 382/8 |
| 5,216,503 | 6/1993 | Paik | 358/133 |
| 5,225,940 | 7/1993 | Ishii et al. | 359/823 |
| 5,230,027 | 7/1993 | Kikuchi | 382/8 |
| 5,243,607 | 9/1993 | Masson et al. | 371/69.1 |
| 5,253,306 | 10/1993 | Nishio | 382/22 |
| 5,253,308 | 10/1993 | Johnson | 382/49 |
| 5,265,173 | 11/1993 | Griffin et al. | 382/22 |
| 5,271,068 | 12/1993 | Ueda et al. | 382/30 |
| 5,287,449 | 2/1994 | Kojima | 395/161 |
| 5,297,256 | 3/1994 | Wolstenholme et al. | 395/162 |
| 5,299,269 | 3/1994 | Gaborski et al. | 382/9 |
| 5,311,598 | 5/1994 | Bose et al. | 382/8 |
| 5,315,388 | 5/1994 | Shen et al. | 348/718 |
| 5,319,457 | 6/1994 | Nakahashi et al. | 348/387 |
| 5,327,156 | 7/1994 | Masukane et al. | 345/113 |
| 5,337,267 | 8/1994 | Colavin | 364/753 |
| 5,363,507 | 11/1994 | Nakayama et al. | 395/800 |
| 5,367,439 | 11/1994 | Mayer et al. | 362/32 |
| 5,367,667 | 11/1994 | Wahlquist et al. | 395/575 |
| 5,371,690 | 12/1994 | Engel et al. | 382/8 |
| 5,388,197 | 2/1995 | Rayner | 395/154 |
| 5,388,252 | 2/1995 | Dreste et al. | 395/575 |
| 5,398,292 | 3/1995 | Aoyama | 382/22 |
| 5,432,525 | 7/1995 | Maruo et al. | 345/2 |
| 5,440,699 | 8/1995 | Farrand et al. | 395/700 |
| 5,455,870 | 10/1995 | Sepai et al. | 382/147 |
| 5,455,933 | 10/1995 | Schieve et al. | 395/892 |
| 5,475,766 | 12/1995 | Tsuchiya et al. | 382/144 |
| 5,477,138 | 12/1995 | Erjavic et al. | 324/765 |
| 5,481,712 | 1/1996 | Silver et al. | 395/700 |
| 5,485,570 | 1/1996 | Bushboom et al. | 395/161 |
| 5,491,780 | 2/1996 | Fyles et al. | 395/153 |
| 5,495,424 | 2/1996 | Tokura | 382/150 |
| 5,495,537 | 2/1996 | Bedrosian et al. | 382/209 |
| 5,519,840 | 5/1996 | Matias et al. | 395/375 |
| 5,526,050 | 6/1996 | King et al. | 348/387 |
| 5,532,739 | 7/1996 | Garakani et al. | 382/150 |
| 5,550,763 | 8/1996 | Michael et al. | 382/149 |
| 5,559,904 | 9/1996 | Holzmann | 382/286 |
| 5,566,877 | 10/1996 | McCormack | 228/105 |
| 5,568,563 | 10/1996 | Tanaka et al. | 382/144 |
| 5,574,668 | 11/1996 | Beaty | 364/558 |
| 5,574,801 | 11/1996 | Collet-Beillon | 382/150 |
| 5,583,949 | 12/1996 | Smith et al. | 382/199 |
| 5,583,954 | 12/1996 | Garakani | 382/278 |
| 5,592,562 | 1/1997 | Rooks | 382/150 |
| 5,594,859 | 1/1997 | Palmer et al. | 395/330 |
| 5,598,345 | 1/1997 | Tokura | 382/145 |
| 5,602,937 | 2/1997 | Bedrosian et al. | 382/151 |
| 5,608,872 | 3/1997 | Schwartz et al. | 395/340 |
| 5,621,811 | 4/1997 | Roder et al. | 382/149 |
| 5,640,199 | 6/1997 | Garakani et al. | 348/87 |
| 5,640,200 | 6/1997 | Michael | 348/87 |
| 5,652,658 | 7/1997 | Jackson et al. | 348/126 |
| 5,761,337 | 6/1998 | Nishimura | 382/150 |

OTHER PUBLICATIONS

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

Figure 2A

| 10 | 10 | 10 | 10 | 10 | 10 | 10 | 10 | 10 | 10 | 10 | 10 | 10 | 10 |
|----|----|----|----|----|----|----|----|----|----|----|----|----|----|
| 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 |
| 10 | 10 | 10 | 10 | 10 | 11 | 11 | 11 | 11 | 10 | 10 | 10 | 10 | 10 |
| 10 | 10 | 10 | 10 | 11 | 12 | 12 | 12 | 12 | 11 | 10 | 10 | 10 | 10 |
| 10 | 10 | 10 | 11 | 12 | 12 | 13 | 13 | 12 | 12 | 11 | 10 | 10 | 10 |
| 10 | 10 | 10 | 11 | 12 | 13 | 14 | 15 | 13 | 12 | 11 | 10 | 10 | 10 |
| 10 | 10 | 10 | 11 | 12 | 13 | 15 | 16 | 13 | 12 | 11 | 10 | 10 | 10 |
| 10 | 10 | 10 | 11 | 12 | 12 | 13 | 13 | 12 | 12 | 11 | 10 | 10 | 10 |
| 10 | 10 | 10 | 10 | 11 | 12 | 12 | 12 | 12 | 11 | 10 | 10 | 10 | 10 |
| 10 | 10 | 10 | 10 | 10 | 11 | 11 | 11 | 11 | 10 | 10 | 10 | 10 | 10 |
| 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 |
| 10 | 10 | 10 | 10 | 10 | 10 | 10 | 10 | 10 | 10 | 10 | 10 | 10 | 10 |

MACHINE VISION METHODS FOR DETERMINING CHARACTERISTICS OF THREE-DIMENSIONAL OBJECTS

RESERVATION OF COPYRIGHT

The disclosure of this patent document contains material which is subject to copyright protection. The owner thereof has no objection to facsimile reproduction by anyone of the patent document or of the patent disclosure, as it appears in the U.S. Patent and Trademark Office patent file or records, but otherwise reserves all rights under copyright law.

BACKGROUND OF THE INVENTION

The invention pertains to machine vision and, more particularly, to machine vision methods for determining spatial characteristics of three-dimensional objects, such as the solder bumps on ball grid array devices and "flip" chips.

In automated assembly processes, such as those for assembling electronic circuit boards, it is important to verify the existence and robustness of components prior to placing them for assembly. For example, in order to make assemblies with ball grid array (BGA) devices and flip chips, an automated assembly system must verify the existence of solder "bumps" on those devices and chips, before attempting to align them for soldering of leads or other circuit components.

Verifying the existence and location of solder bumps and other features on the surfaces of electronic components is ever more difficult as the size of components decrease and the number of features increase. This is the case with ball grid array devices, which may have tens or hundreds of conductive solder bumps arranged in regular patterns. This is also the case with flip chips, whose surfaces include complicated "art work" and circuit traces, as well as solder bumps. Due to the small size and complexity of these devices, it is difficult to distinguish well-formed solder bumps on their surfaces from defective bumps and from other features, such as solder pads.

The prior art suggests a few approaches to finding solder bumps on circuit devices. The traditional approaches are primarily binary techniques based on two-dimensional "blob" analysis of the solder bump array images. A drawback of these approaches is that, due to their binary nature, they are highly susceptible to adverse lighting conditions or device-to-device variations. More significantly, they do not adequately distinguish properly formed solder bumps from imperfects bumps and solder pads.

Although not the subject of this invention, the art provides techniques for generating "height" images. Unlike conventional images (which are referred to herein as "intensity" images) containing pixels that represent the intensities (e.g., brightness or color) of corresponding portions of a scene, height images contain pixels that represent the heights of those corresponding portions.

An object of this invention is to provide improved methods for machine vision analysis and, particularly, improved methods for determining spatial characteristics of objects such as solder bumps.

More particularly, an object of the invention is to provide methods for interpreting height images to determine the spatial characteristics of objects shown in those images.

Yet another object of the invention is to provide machine vision methods for interpreting height images to provide information that permit three-dimensional objects, such as solder bumps, to be distinguished from two-dimensional objects, such as solder pads. A related object is to provide methods that provide information permitting well-formed three-dimensional objects to be distinguished from poorly formed three-dimensional objects.

Yet still another object of the invention is to provide such methods that can execute quickly, and without undue consumption of resources, on a wide range of machine vision analysis equipment.

SUMMARY OF THE INVENTION

The foregoing objects are attained by the invention which provides, in one aspect, a method for determining spatial characteristics of a selected object in a "height" image that has pixel values representing heights of corresponding portions of the object. The method is characterized by the steps of determining, from the height image, a height for each of a plurality of portions of the object, determining a volume of the object above a selected height by summing a count representing the cross-sectional area of the object at that height with a count representing the volume of the object above that height, and outputting the volume so determined.

In a related aspect, the invention provides a method for determining a cross-sectional area of an object from the height image by determining, from the image, one or more heights of portions of the object and summing a count of pixels in the object at the selected height with a count representing the cross-sectional area of the object above that height.

In a further related aspect, the invention provides a method for determining spatial characteristics of a selected object represented by a height image by determining, from the image, one or more heights of portions of the object, determining a cross-sectional area of the object at a selected height by summing a count of pixels in the object at the selected height with a count representing the cross-sectional area of the object above the selected height, determining a volume of the object above the selected height by summing a count representing the cross-sectional area of the object at that height with a count representing the volume of the object above that height, and outputting the volume so determined.

Other aspects of the invention provide methods as described above in which the volume and cross-sectional area determinations are made with respect to each of at least selected heights in the object, beginning with a greater height and progressing through lesser heights.

Still other aspects of the invention provide methods as described above in which the volume of the object below a selected height is determined by summing a count representing the cross-sectional area of the object at that height with a count representing a volume of the object below that height. In related aspects, the invention provides such methods wherein the volume determinations are made with respect to each of at least selected heights in the object, beginning with the lesser height and progressing through greater heights.

The invention also provides methods as described above in which the heights of portions of the object are found by generating a histogram from the height image.

In other aspects, the invention provides such methods that further include the steps of determining a base height of one or more objects in the image, performing connectivity analysis to identify one or more objects in the image having heights at or above the base height, and performing the aforementioned volume and cross-sectional area determinations on one or more of those objects.

In yet other aspects, the invention provides methods as described above for determining spatial characteristics of a solder bump depicted in a height image.

These and other aspects of the invention are evident in the attached drawings and in the description and claims that follow.

As those skills in the art will appreciate from the discussion herein, the invention has wide application in industrial and research applications. It can be used to identify rapidly, and without undue consumption of resources, spatial characteristics of objects in height images, such as volumetric characteristics. From this, an operator or other machine vision apparatus can determine whether a three-dimensional object represented in the image has desired physical characteristics. This can be used, for example, to distinguish a properly formed solder bump from a defective solder bump or solder pad.

BRIEF DESCRIPTION OF THE DRAWINGS

A more complete understanding of the invention may be attained by reference to the drawings, in which:

FIG. 2A–2C depict aspects of a height image acquired for processing by a method according to the invention.

DETAILED DESCRIPTION OF THE ILLUSTRATED EMBODIMENT

Figure 1:
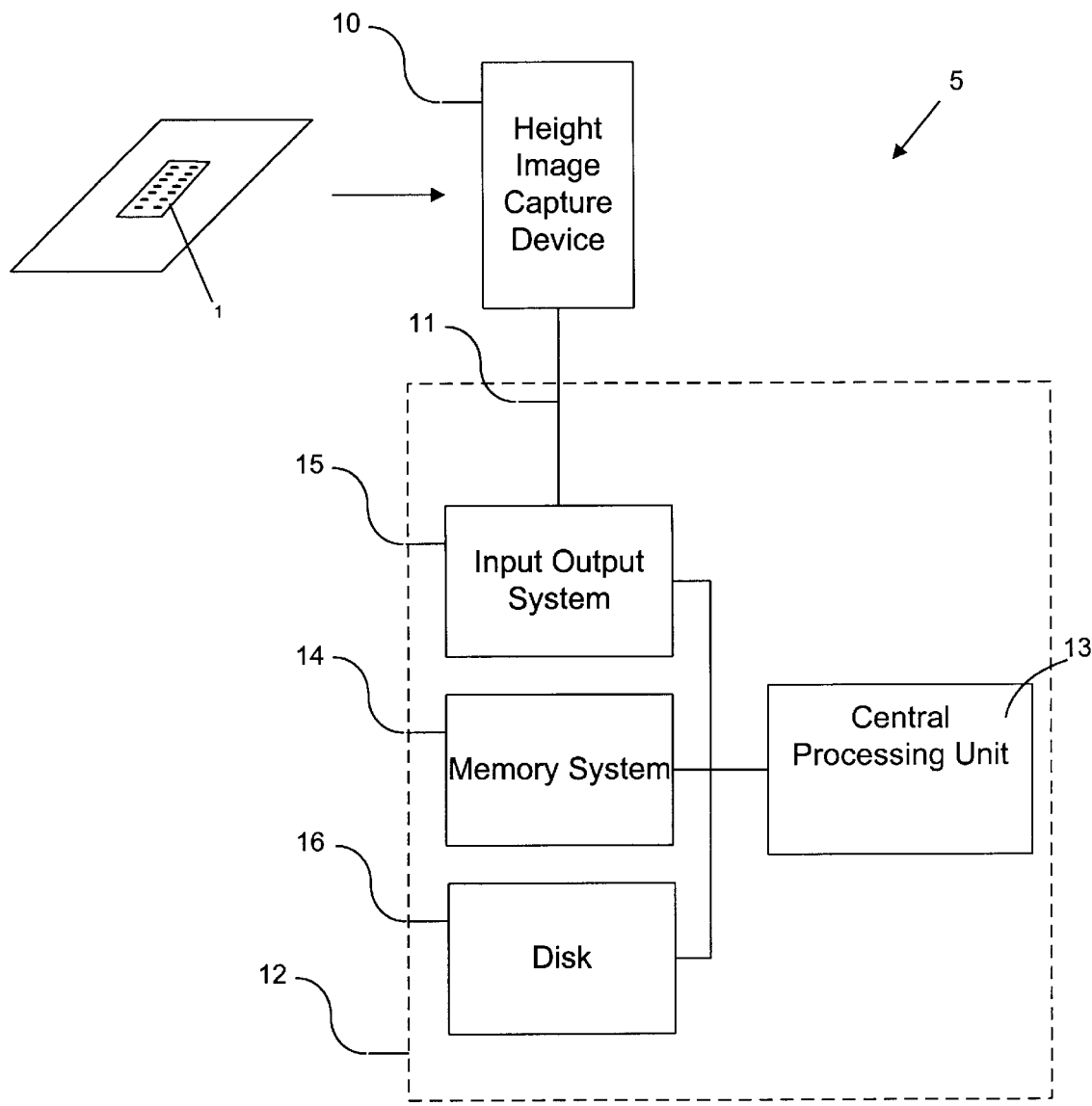
FIG. 1 depicts a machine vision system for use in practice of the invention.

FIG. 1 illustrates a system 5 for determining spatial characteristics, such as volume and cross-sectional area profiles, of an object shown in a "height" image. The system 5 includes a capturing device 10 that generates height image data representing a scene including an object 1. The height image comprises pixel data representing the heights of corresponding portions of the scene, much like a conventional "intensity" image comprises pixel data representing the brightness or color of those portions. Capturing device 10, which is not the subject of the present invention, is of a conventional type known in the art.

The height image data is transmitted from capturing device 10 via a communications path 11 to height image analysis system 12. This can be a conventional digital data processor, or a vision processing system of the type commercially available from the assignee hereof, Cognex Corporation, programmed in accord with the teachings hereof to determine spatial characteristics of objects represented in the height image. The image analysis system 12 may have one or more central processing units 13, main memory 14, input-output system 15 and disk drive (or other mass storage device) 16, all are the conventional type.

The system 12 and, more particularly, central processing unit 13, is configured by programming instructions according to the teachings hereof for determination of spatial characteristics, as described in further detail below. Those skilled in the art will appreciate that, in addition to implementation on a programmable digital data processor, the methods taught herein can be implemented in special purpose hardware.

Figure 2A:
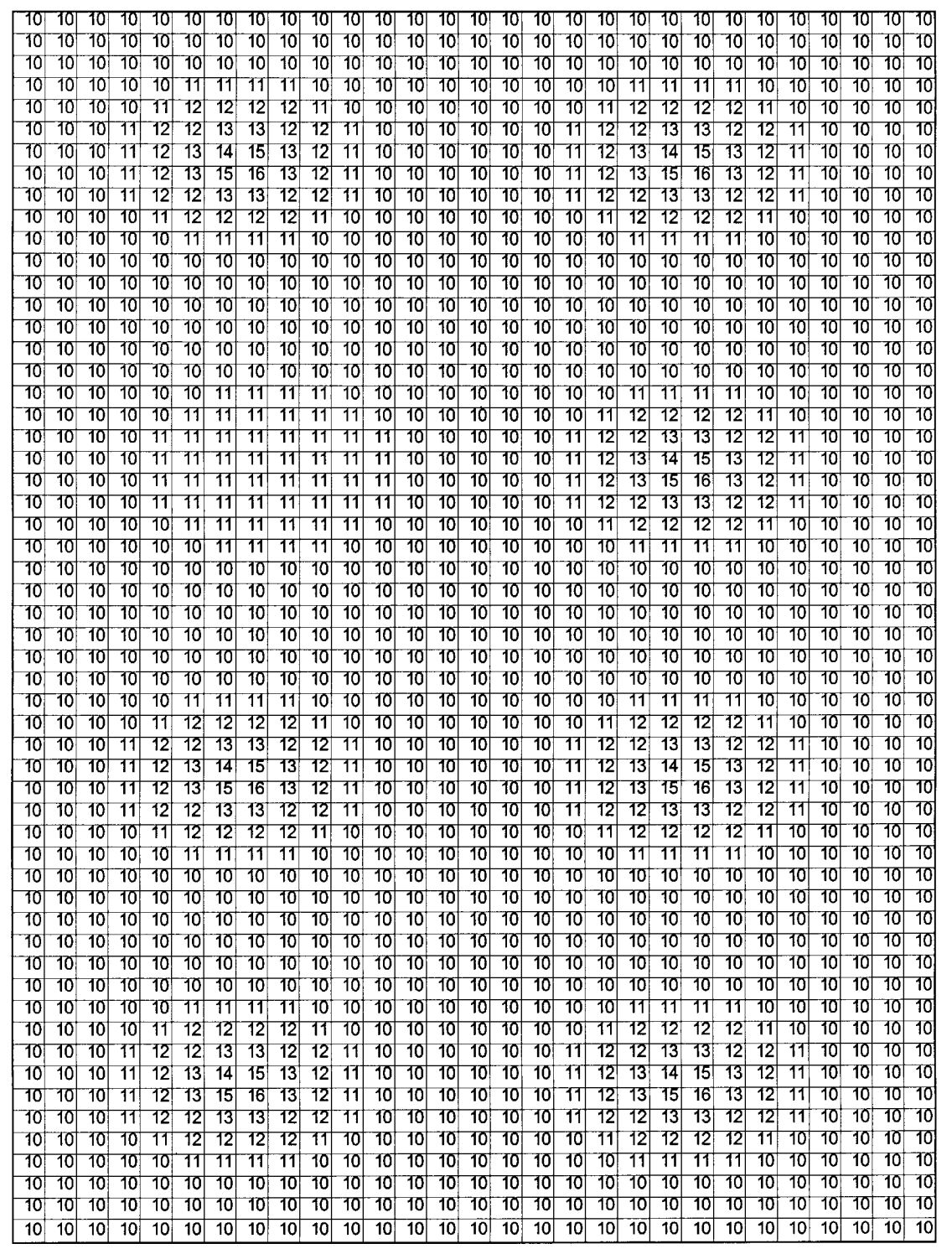

FIG. 2A depicts in tabular form height image data of the type processed by methods according to the invention. Each element or "pixel" in the table indicates the height of a corresponding portion of the scene captured by device 10. Although the table presents those heights in decimal format, it will be appreciated that they are conventionally represented in binary format.

Figure 2B:
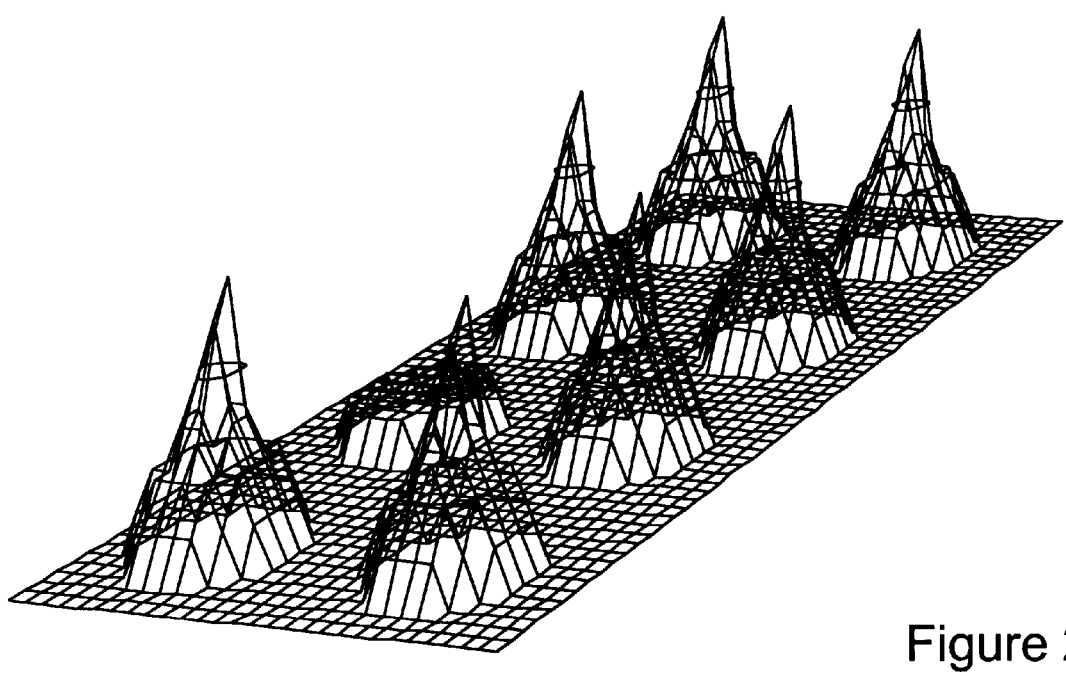

FIG. 2B is a graphical representation of the height data shown in the forgoing table. As evident in the illustration, the height data represents eight projections from a surface. Those projections can be, for example, solder bumps on a BGA device or flip chip. More particularly, they may represent seven well formed solder bumps and one defective bump. They may as well be other projections, such as protruding soldered leads on a printed circuit board.

Methods according to the invention isolate each projection in the image of FIGS. 2A, 2B and determine its spatial characteristics, e.g., its volume and area profiles. These profiles can be used by an operator or other machine vision process to determine whether the projections meet desired spatial characteristics, e.g., whether they represent a well-formed solder bump or otherwise.

Figure 3:
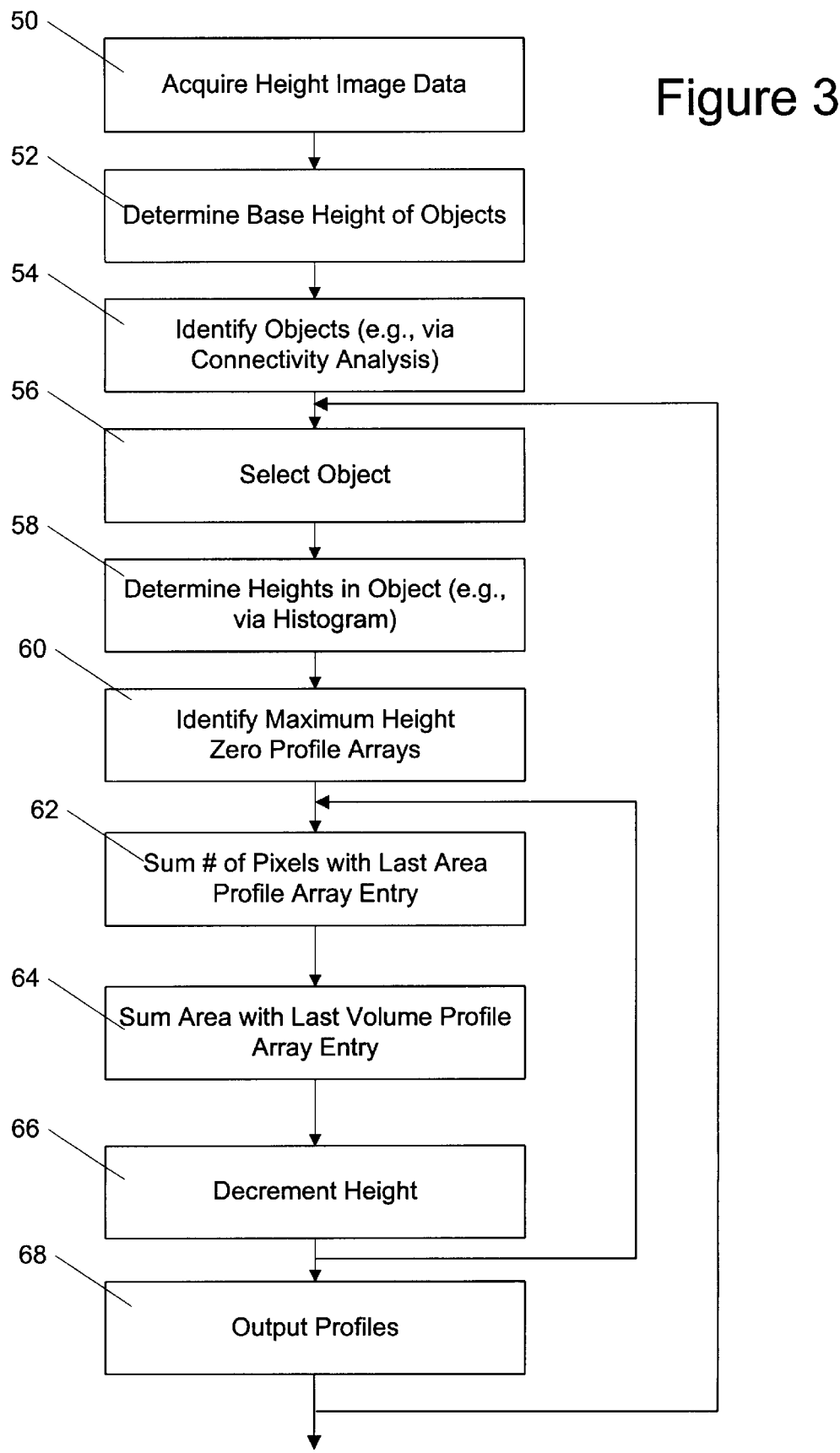
FIG. 3 depicts methodology according to the invention for determining spatial characteristics of an object represented in the height image of FIGS. 2A–2C.

A preferred method for determining those spatial characteristics is illustrated in FIG. 3. There, in step 50, the method acquires height image data. This can be transmitted, for example, in real-time by image capture device 10 or, alternatively, pre-stored to memory 14 or disk 16 of system 5. As discussed above, FIG. 2B provides an example of such height image data.

In step 52, the method finds the base height that best characterizes the edges or periphery of the projections. This can be done, for example, by edge detection and boundary tracking in the manner described in copending, commonly assigned U.S. patent application Ser. No. 07/979,848, filed Nov. 23, 1992, the teachings of which are incorporated herein by reference. Preferably, however, this edge characteristic is determined using the techniques described in copending, commonly assigned U.S. patent application Ser. No. 08/581,975, for Machine Vision Method and Apparatus for Edge-Based Image Histogram Analysis, filed on Jan. 2, 1996, the teachings of which are incorporated herein by reference. Although the teachings of these applications are directed to techniques intensity image data, they can be applied as well to height image data of the type presented herein.

For purposes of the discussion that follows, the base height for the objects shown in FIGS. 2B is assumed to be 11.

Once the base height is ascertained, the method performs connectivity analysis to identify all objects in the height image that project above the edge or "base" height. This identifies the discrete objects in the height image by placing labels on all of the height pixels. Each group of pixels that connect to form an object are assigned a distinct label. There are as many labels as there are different objects. This can be conducted in the conventional manner known in the art, e.g., as described in form Robot Vision (MIT Press, 1986) at Section 4.1, the teachings of which are incorporated herein by reference. A preferred technique for connectivity analysis is to use a tool, blob_connectivity, in the machine vision standard software set available from the assignee hereof, Cognex Corporation.

Once the base height of the objects (or projections) in the height image are identified, the method analyses each one to determine its spatial or three-dimensional characteristics. This begins with step 56, where the method begins an iterative sequence for analyzing each object.

Those skilled in the art will appreciate that steps 52–54 are intended to identify an object of interest in the height image data. Techniques other than those described above may be used applied as well to this end. For example, an object of interest may be identified by segmenting the image to distinguish a particular object from its background (and from other objects).

In step 58, the method determines the heights that make up the object of interest. This is preferably done by generating a histogram of the object. This is a tally or count of the number of "pixels" in the object at each height. Referring to the height image data in FIG. 2C (which is extracted from the table of FIG. 2a), the projection represented by that data has a height histogram as follows:

| Height | 11 | 12 | 13 | 14 | 15 | 16 |
|--------|----|----|----|----|----|----|
| Count  | 20 | 20 | 8  | 1  | 2  | 1  |

A histogram of the type shown above can be determined in any manner conventional in the art.

From the histogram, the maximum height of the projection is readily determined, to wit, as the maximum populated value in the histogram—in this instance, 16. Beginning with that maximum value, the method steps through the successive height values to determine the volume and cross-sectional area profiles of the projection.

Thus, in step 60, the method selects the maximum height to begin iterative analysis of the cross-sectional areas and volumes of the object. These are stored, respectively, in cross-sectional area and volume profile arrays. In a preferred embodiment, each array includes as many elements as heights in the object.

In step 62, the method generates the cross-sectional area profile array entry value for the "current" height (i.e., initially, the maximum height). This is generated as the sum of the count (or number) of pixels in the object at that height (as determined from the histogram) and the count representing the cross-sectional area above that height. It will be appreciated that the count represented by the cross-sectional area profile array entry value at each height is, effectively, the cross-sectional area of the object from that height upward.

Likewise, in step 64, the method generates the volume profile array entry value for the "current" height. This is generated as a sum of the count representing the cross-sectional area at that height, as determined from the cross-sectional area profile array, and the count representing the volume above that height, as determined from the volume profile array. It will be appreciated that the count represented in the volume profile array entry value at each height is, effectively, the volume of the object from that height upward.

In step 66, the method decrements the selected height and returns to step 62 to generate the volume and cross-sectional area profile array entries for the next successive height. While the cross-sectional area profile is preferably determined from top-to-bottom, the volume profile can be determined from top-to-bottom (in parallel with determination of the cross-sectional area profile) or bottom-to-top (subsequent to determination of the cross-sectional area profile). In the latter case, the volume profile array entry value at each height is, effectively, the volume of the object from that height downward.

Iterative processing of the histogram for all height values results in a cross-sectional area profile and a volume profile as indicated below:

| Height | 11  | 12 | 13 | 14 | 15 | 16 |
|--------|-----|----|----|----|----|----|
| Count  | 20  | 20 | 8  | 1  | 2  | 1  |
| Area   | 52  | 32 | 12 | 4  | 3  | 1  |
| Volume | 104 | 52 | 20 | 8  | 4  | 1  |

In step 68, the method selectively outputs these profiles or portions thereof, e.g., in response to user requests. The method then loops back to step 56 for selection and processing of the next projection in the height image data.

Described above are improved machine vision methods meeting the objects set forth herein. It will be appreciated that the embodiments shown in the drawings and described above are illustrative only. Further embodiments incorporating modifications within the ken of those ordinary skilled in the art are also encompassed by the invention. By way of non-limiting example, it will be appreciated that the volume profiles can be generated, not only by decrementing from the maximum height to the minimum height in histogram, but also by incrementing from the minimum height to the maximum height. Furthermore, the methods described above can be incorporated in, or used in conjunction with, a variety of machine vision functions.

As noted above, the invention has wide application in industry and research applications. It can be used rapidly, and without undue consumption of resource, to determine spatial characteristics of objects in height images. If those objects represent solder bumps, for example, this information can be used to verify the existence and form of the bumps, e.g., prior to soldering leads to them or prior to other manufacturing steps.

In view of the foregoing, what I claim is:

1. A method for determining spatial characteristics of a selected object in an image that has pixel values representing heights of corresponding portions of the object, the method comprising the steps of
    A. identifying, from the image, heights of portions of the selected object;
    B. performing the following steps to determine a spatial characteristic of the selected object:
        i. determining a value of a cross-sectional area of the object above a selected height by summing a count of pixels in the object at the selected height and a count representing a cross-sectional area of the object above that height;
        ii. determining a value of a volume of the object above the selected height by summing a count representing the cross-sectional area of the object at the selected height and a count representing the volume of the object above that height;
    C. outputting at least one of the cross-sectional area and volume so determined.

2. A method according to claim 1, wherein at least one of the determining steps are made with respect to each of at least selected heights in the selected object, beginning with the maximum height and progressing through lesser heights.

3. A method according to claim 1, wherein the step of identifying heights of the image includes the step of generating a histogram of the heights of the selected object.

4. A method according to claim 1, including the steps of
    determining a base height of one or more objects in the image;
    performing connectivity analysis to identify one or more objects in the image portions of which are at heights at or above the base height;
    selecting one of those objects as the selected object.

5. A method for determining spatial characteristics of one or more objects in an image that has pixel values representing heights of corresponding portions of the objects, the method comprising the steps of
    A. determining a base height of one or more objects in the image;
    B. performing connectivity analysis to identify one or more objects in the image having heights at or above the base height;
    C. for each of one or more objects in the image, performing the following steps:
        i. identifying, from the image, heights of portions of the object;

ii. for each of at least selected heights in the object, beginning with the maximum height and progressing through lesser heights, performing the following steps:
  a. determining a value of a cross-sectional area of the object at the selected height by summing a count of pixels in the object at the selected height and a count, if any, representing the cross-sectional area of the object above that height;
  b. determining a value of a volume of the object at the selected height by summing a count representing the cross-sectional area of the object at the selected height and a count, if any, representing the volume of the object above that height;
iii. outputting at least one of the cross-sectional area and volume so determined.

6. A method according to claim 5, wherein the determining steps of steps C.ii.a and C.ii.b are made with respect to each height in the object, beginning with the maximum height and progressing successively through each of the lesser heights.

7. A method for determining spatial characteristics of a selected object in an image that has pixel values representing heights of corresponding portions of the object, the method comprising the steps of A. identifying, from the image, heights of portions of the selected object;
B. performing the following steps in order to determine one or more spatial characteristics of the selected object:
  i. for each of at least selected heights in the selected object, beginning with the greater height and progressing through lesser heights, determining a value of a cross-sectional area of the object at the selected height by summing a count of pixels in the object at the selected height and a count, if any, representing the cross-sectional area of the object at a greater height;
  ii. for each of at least selected heights in the selected object, beginning with the lesser height and progressing through greater heights, determining a value of a volume of the object below the selected height by summing a count representing the cross-sectional area of the object at the selected height and a count representing the volume of the object below that height;
C. outputting at least one of the cross-sectional area and volume so determined.

8. A method according to claim 7, wherein at least one of the steps of identifying heights of the image includes the step of generating a histogram of the heights of the selected object.

9. A method according to claim 8, including the steps of
determining a base height of one or more objects in the image;
performing connectivity analysis to identify one or more objects in the image portions of which are at heights at or above the base height; and
selecting one of those objects as the selected object.

10. A method for determining spatial characteristics of a solder bump in an image that has pixel values representing heights of corresponding portions of the solder bump, the method comprising the steps of A. identifying, from the image, heights of portions of the solder bump;
B. performing the following steps in order to determine one or more spatial characteristics of the solder bump:
  i. determining, from the image, a value of a cross-sectional area of the solder bump at a selected height by summing a count of pixels in the solder bump at the selected height and a count representing a cross-sectional area of the solder bump at a greater height;
  ii. determining a value of a volume of the solder bump at the selected height by summing a count representing a cross-sectional area of the solder bump at the selected height and a count representing of the volume of the solder bump above that height;
C. outputting at least one of the cross-sectional area and volume so determined.

11. A method for determining spatial characteristics of one or more solder bumps in an image that has pixel values representing heights of corresponding portions of the solder bumps, the method comprising the steps of A. determining a base height of one or more solder bumps in the image;
B. performing connectivity analysis to identify one or more solder bumps in the image having heights at or above the base height;
C. for each of one or more solder bumps in the image, performing the following steps:
  i. identifying, from the image, heights of portions of the solder bump;
  ii. for each of at least selected heights in the solder bump, beginning with the maximum height and progressing through lesser heights, performing the following steps:
    a. determining a value of a cross-sectional area of the solder bump at the selected height by summing a count of pixels in the solder bump at the selected height and a count, if any, representing the cross-sectional area of the solder bump at a greater height;
    b. determining a value of a volume of the solder bump at the selected height by summing a count representing the cross-sectional area of the solder bump at the selected height and a count, if any, representing the volume of the solder bump above that height;
  iii. outputting at least one of the cross-sectional area and volume so determined.

12. A method for determining spatial characteristics of a selected solder bump in an image that has pixel values representing heights of corresponding portions of the solder bump, the method comprising the steps of A. identifying, from the image, heights of portions of the solder bump;
B. performing the following steps in order to determine one or more spatial characteristics of the selected solder bump:
  i. for each of at least selected heights in the solder bump, beginning with the greater height and progressing through lesser heights, determining a value of a cross-sectional area of the solder bump at the selected height by summing a count of pixels in the solder bump at the selected height and a count, if any, representing the cross-sectional area of the solder bump above that height;
  ii. for each of at least selected heights in the solder bump, beginning with the lesser height and progressing through greater heights, determining a value of a volume of the solder bump below the selected height by summing a count representing the cross-sectional area of the solder bump at the selected height and a count representing the volume of the solder bump below a lesser height;
C. outputting at least one of the cross-sectional area and volume so determined.

13. A method for determining spatial characteristics of a selected object in an image that has pixel values representing heights of corresponding portions of the object, the method comprising the steps of A. identifying, from the image, heights of portions of the selected object;

B. determining a value of a cross-sectional area of the object above a selected height by summing a count of pixels in the object at the selected height and a count representing a cross-sectional area of the object above that height;

C. outputting the cross-sectional area so determined.

14. A method according to claim 13, wherein the determining step is made with respect to each of at least selected heights in the selected object, beginning with the maximum height and progressing through lesser heights.

15. A method according to claim 13, wherein the step of identifying heights of the image includes the step of generating a histogram of the heights of the selected object.

16. A method according to claim 13, including the steps of determining a base height of one or more objects in the image;

performing connectivity analysis to identify one or more objects in the image portions of which are at heights at or above the base height;

selecting one of those objects as the selected object.

17. A method for determining spatial characteristics of one or more objects in an image that has pixel values representing heights of corresponding portions of the objects, the method comprising the steps of A. determining a base height of one or more objects in the image;

B. performing connectivity analysis to identify one or more objects in the image having heights at or above the base height;

C. for each of one or more objects in the image, performing the following steps:
 i. identifying, from the image, heights of portions of the object;
 ii. for each of at least selected heights in the object, beginning with the maximum height and progressing through lesser heights, determining a value of a cross-sectional area of the object at the selected height by summing a count of pixels in the object at the selected height and a count, if any, representing the cross-sectional area of the object above that height;
 iii. outputting the cross-sectional area so determined.

18. A method according to claim 17, wherein the determining step C.ii is made with respect to each height in the object, beginning with the maximum height and progressing successively through each of the lesser heights.

19. A method for determining spatial characteristics of a selected object in an image that has pixel values representing heights of corresponding portions of the object, the method comprising the steps of A. identifying, from the image, heights of portions of the selected object;

B. for each of at least selected heights in the selected object, beginning with the greater height and progressing through lesser heights, determining a value of a cross-sectional area of the object at the selected height by summing a count of pixels in the object at the selected height and a count, if any, representing the cross-sectional area of the object at a greater height;

C. outputting the cross-sectional area so determined.

20. A method according to claim 19, wherein the step of identifying heights of portions of the image includes the step of generating a histogram of the heights of the selected object.

21. A method according to claim 20, including the steps of determining a base height of one or more objects in the image;

performing connectivity analysis to identify one or more objects in the image portions of which are at heights at or above the base height; and selecting one of those objects as the selected object.

22. A method for determining spatial characteristics of a solder bump in an image that has pixel values representing heights of corresponding portions of the solder bump, the method comprising the steps of A. identifying, from the image, heights of portions of the solder bump;

B. determining, from the image, a value of a cross-sectional area of the solder bump at a selected height by summing a count of pixels in the solder bump at the selected height and a count representing a cross-sectional area of the solder bump at a greater height;

C. outputting the cross-sectional area so determined.

23. A method for determining spatial characteristics of one or more solder bumps in an image that has pixel values representing heights of corresponding portions of the solder bumps, the method comprising the steps of A. determining a base height of one or more solder bumps in the image;

B. performing connectivity analysis to identify one or more solder bumps in the image having heights at or above the base height;

C. for each of one or more solder bumps in the image, performing the following steps:
 i. identifying, from the image, heights of portions of the solder bump;
 ii. for each of at least selected heights in the solder bump, beginning with the maximum height and progressing through lesser heights, determining a value of a cross-sectional area of the solder bump at the selected height by summing a count of pixels in the solder bump at the selected height and a count, if any, representing the cross-sectional area of the solder bump at a greater height;
 iii. outputting the cross-sectional area so determined.

24. A method for determining spatial characteristics of a selected solder bump in an image that has pixel values representing heights of corresponding portions of the solder bump, the method comprising the steps of A. identifying, from the image, heights of portions of the solder bump;

B. for each of at least selected heights in the solder bump, beginning with the greater height and progressing through lesser heights, determining a value of a cross-sectional area of the solder bump at the selected height by summing a count of pixels in the solder bump at the selected height and a count, if any, representing the cross-sectional area of the solder bump above that height;

C. outputting the cross-sectional area so determined.

* * * * *